(12) United States Patent
Ermakov

(10) Patent No.: US 8,192,701 B2
(45) Date of Patent: Jun. 5, 2012

(54) SURFACE TENSION CONTROLLED VALVES

(75) Inventor: Sergey V. Ermakov, Hayward, CA (US)

(73) Assignee: Applied Biosystems, LLC, Carlsbad, CA (US)

( * ) Notice: Subject to any disclaimer, the term of this patent is extended or adjusted under 35 U.S.C. 154(b) by 0 days.

(21) Appl. No.: 13/283,240

(22) Filed: Oct. 27, 2011

(65) Prior Publication Data

US 2012/0097257 A1    Apr. 26, 2012

Related U.S. Application Data

(63) Continuation of application No. 12/702,162, filed on Feb. 8, 2010, now abandoned, which is a continuation of application No. 11/330,360, filed on Jan. 10, 2006, now abandoned.

(60) Provisional application No. 60/642,828, filed on Jan. 11, 2005.

(51) Int. Cl.
*F15C 1/06* (2006.01)

(52) U.S. Cl. ........ 422/537; 422/501; 422/502; 422/504; 422/505; 436/180

(58) Field of Classification Search ............... 422/501, 422/502, 504, 505, 537
See application file for complete search history.

(56) References Cited

U.S. PATENT DOCUMENTS

2003/0224528 A1 *  12/2003  Chiou et al. ............... 436/164
* cited by examiner

*Primary Examiner* — Brian R Gordon
*Assistant Examiner* — Shogo Sasaki

(57) ABSTRACT

The present teachings relate to surface tension controlled valves used for handling biological fluids. The valves controlled by optically actuating an electro-wetting circuit.

15 Claims, 8 Drawing Sheets

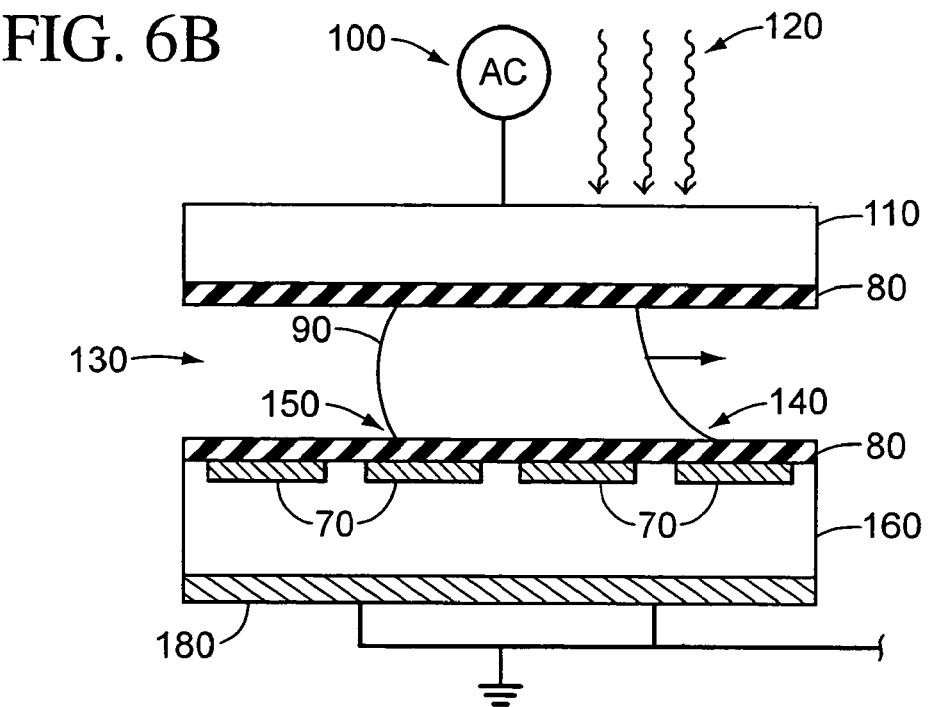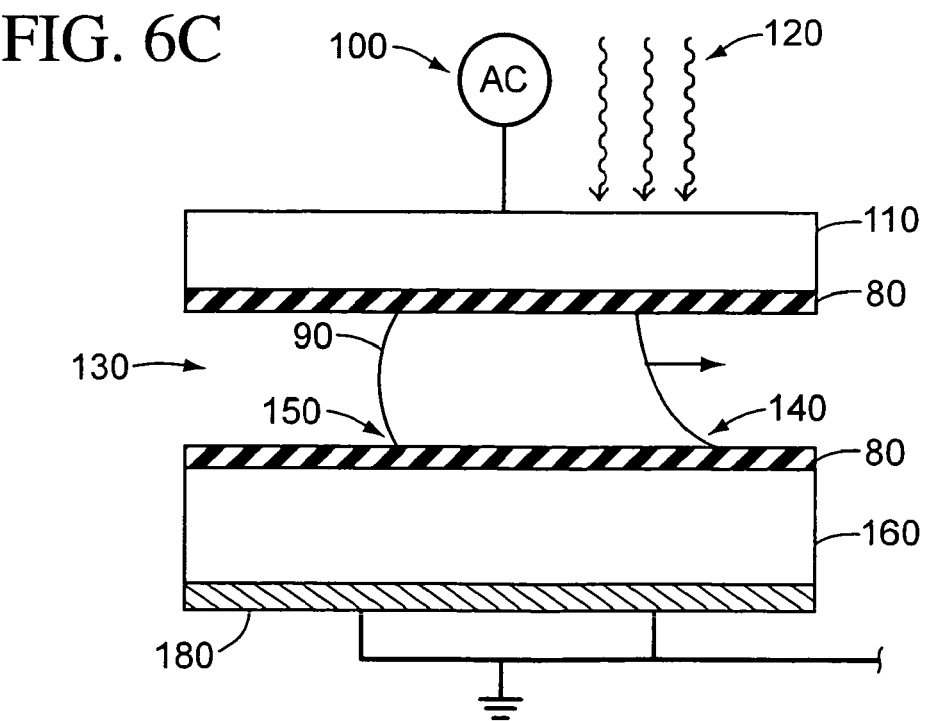

SURFACE TENSION CONTROLLED VALVES

CROSS-REFERENCE TO RELATED APPLICATIONS

This application is a continuation of U.S. application Ser. No. 12/702,162, filed Feb. 8, 2010, now abandoned which is a continuation of U.S. application Ser. No. 11/330,360, filed Jan. 10, 2006, now abandoned which claims priority to U.S. patent application No. 60/642,828, filed Jan. 11, 2005, which disclosures are herein incorporated by reference in their entireties.

FIELD

The present teachings relate to surface tension controlled valves, which may be suitable for controlling liquid flow.

INTRODUCTION

One of the challenges encountered in devices, for example, microfluidic devices designed for high throughput operations, is effective control of fluid flow. It may be difficult to individually and independently control fluid flow in thousands of microchannels without requiring fabrication of sophisticated valving systems, which may substantially increase the cost of manufacturing microfluidic devices. Addressing and actuating thousands of individual valves in a device may be very complex. It could be beneficial to devise a method for manipulating fluid flow inside a device, for example a microfluidic device, with great flexibility and, more specifically, employ valves that can be easily and independently actuated. The use of such valves could make it practical to implement a variety of devices, such as lab-on-a-chip devices.

SUMMARY

In various embodiments, the present teachings can provide a surface tension controlled valving system for biological fluid, including a channel connected to an internal volume for the valving system, wherein the internal volume is bound by an insulating layer resistant to the flow of the biological liquid, and wherein the channel is not resistant to the flow of the biological liquid, a photoconductive material coupled to the insulating layer, an electrode coupled to the photoconductive material and configured to electrically couple with the insulating layer through the photoconductive material, and a power source electrically coupled to the electrode, wherein the power source is configured to provide an electrical potential difference between the photoconductive material and the biological fluid, wherein the photoconductive material is activatable by directed light to provide the electrical potential difference between the insulating layer and the biological fluid, and wherein the electrical potential difference is configured to reduce the resistance of the insulating layer to the flow of the biological liquid.

In various embodiments, the present teachings can provide a device for biological fluid handling, including a valve configured for light activation, a channel connected to an internal volume of the valve, wherein the internal volume is bound by an insulating layer resistant to the flow of the biological liquid, and wherein the channel is not resistant to the flow of the biological liquid, a photoconductive material coupled to the insulating layer, an electrode coupled to the photoconductive material and configured to electrically couple with the insulating layer through the photoconductive material, and a power source electrically coupled to the electrode, wherein the power source is configured to provide an electrical potential difference between the photoconductive material and the biological fluid, a light source adapted to activate the photoconductive material thereby providing the electrical potential difference between the insulating layer and the biological fluid, wherein the electrical potential difference is configured to reduce the resistance of the insulating layer to the flow of the biological liquid.

In various embodiments, the present teachings can provide a device for biological fluid handling, including means for providing the biological fluid to a valving means, wherein the means for providing the biological fluid is not resistant to the flow of the biological liquid, and wherein the valving means is resistant to the flow of the biological liquid, means for electrowetting the valving means to reduce the resistance of the valving means to the flow of the biological liquid, and means for optically activating the means for electrowetting.

It is to be understood that both the foregoing general description and the following description of various embodiments are exemplary and explanatory only and are not restrictive.

BRIEF DESCRIPTION OF THE DRAWINGS

The accompanying drawings, which are incorporated in and constitute a part of this specification, illustrate various embodiments. In the drawings.

DESCRIPTION OF VARIOUS EMBODIMENTS

Figure 1:
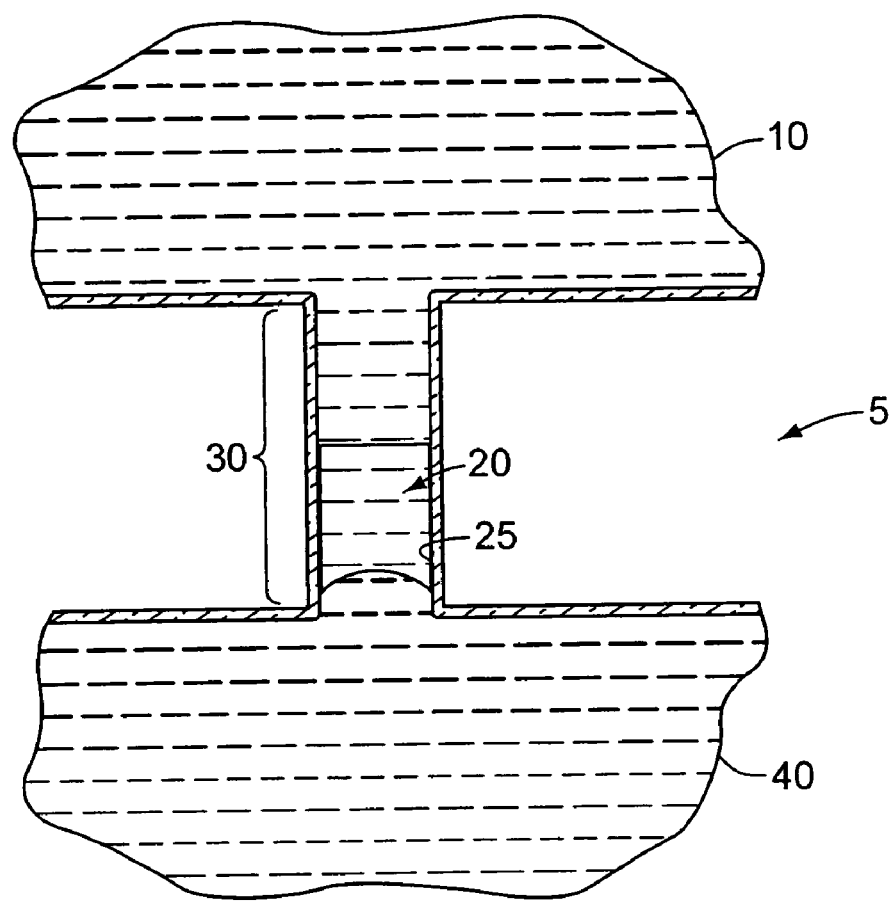
FIG. 1 illustrates a channel connecting two reservoirs according to the present teachings.

Reference will now be made to various exemplary embodiments, examples of which are illustrated in the accompanying drawings. Wherever possible, the same reference numbers are used in the drawings and the description to refer to the same or like parts.

In various embodiments, the surface tension controlled valves may be operable with any biological liquid that is capable of being manipulated by electrowetting forces. The term "biological liquid" as used herein refers to liquid with biomolecules, for example nucleic acids, peptides, enzymes, cells, etc. Biological liquids that are electrolytic may be used in the surface tension controlled valves according the present teachings. The term "electrolytic" refers to a liquid containing substances dissolved therein, such as ionic salts, that enable the liquid to conducting an electric current. By way of non-limiting example, biological liquids that may be used in the surface tension controlled valves according to the present teachings can include aqueous liquids, such as water and buffered saline, as well as non-aqueous fluids such as dimethylsulfoxide and other non-aqueous solvents. The biological liquids can include ionic liquids may also be used in the surface tension controlled valves according to the present invention. "Ionic liquids" refers to salts that are liquid over a wide temperature range, including room temperature. The biological liquid can include various substances, particulate and otherwise. Such substances may include, for example, surfactants, including anionic, nonionic, cationic, and amphoteric surfactants. The composition of the liquid, including the presence of surfactants, biomolecules, and other substances, may influence the surface wetting, and thus the contact angle, of the liquid.

In various embodiments, channels suitable for use in accordance with the present invention include any volume through which a liquid may be transported. Suitable channels may be made of glass, and may optionally be transparent, or at least partially transparent, when employed in light-actuated surface controlled tension valves. The channels may be constructed of any material suitable for containment of a given liquid, for example glass or a polymeric material. The channels may of any dimension suitable for manipulating fluids in a desired manner. For example, according to various embodiments, the length, width and depth of the channels may range, independently, from 0.1 µm to 10 cm, for example, 10 µm to 1 cm.

In various embodiments, reservoirs suitable for use in the surface tension controlled valves disclosed herein include any space capable of containing a liquid and communicating with at least one channel. The reservoir may be constructed of any material capable of holding a liquid, for example glass or a polymer. The reservoir may be of any shape, for example it may be spherical, semi-spherical, or conical. The reservoir may be of any size sufficient to hold the desired volume of liquid. For example, the reservoir may range in size from 1 nanoliter to 1 liter. In various embodiments, the reservoir is not associated with an electrode, i.e., the liquid in the reservoir itself is not adapted to manipulate a liquid by virtue of a significant electrical potential difference being applied to that liquid.

In various embodiments, at least one portion of a surface of at least one channel is coated with a material that it is chemically resistant to the flow of liquid through the channel. Suitable non-limiting examples of such materials include polymer coatings (e.g., polyamides, polymethylacrylates and their copolymers), BN and SiN, deposited in accordance with any of the thin-film deposition techniques known to those of ordinary skill in the art, and polymer films such as, e.g., Teflon™ (trademark for polytetrafluoroethylene).

In various embodiments, at least one layer of insulation material is formed above the electrode. The surface tension controlled valve may have the insulation layer disposed between the electrode and the internal volume making up the channel. In one aspect of the present teachings, the insulation layer includes at least one layer of silicon oxide and at least one layer of Teflon™ (trademark for polytetrafluoroethylene) . The thicknesses of the two layers may be selected to provide the desired degree of insulation without, in the case of a light-actuated surface tension controlled valve, overly impeding the transmission of light.

In various embodiments, the electrodes used in accordance with the present disclosure are made from any conductive material such as, for example, copper, gold, platinum, and conducting polymers, including polymers that are conducting per se, and conducting composites containing a non-conducting polymer and a conducting material such as a metal or a conducting polymer. A single electrode may be used in the surface tension controlled valves disclosed herein, and multiple electrodes, for example an array of electrodes, may also be used. In various embodiments, the electrode may be transparent, for example, may be formed of transparent indium tin oxide. This permits the passage of light in accordance with certain embodiments of the light actuated valve, and also permits visual inspection of the operation of the valve. In various embodiments, in the case of a light-actuated surface tension controlled valve, the electrode or array of electrodes is in electrical contact with a photoconductive material.

In various embodiments, the photoconductive material used in the light actuated valves corresponds to a material with a dark conductivity ranging from $10^5$ to $10^{12}$ $\Omega \cdot cm$. The photoconductive material exhibits relatively low conductivity when dark, and relatively high conductivity when illuminated by a light source. In various embodiments, an example of a suitable photoconductive material is amorphous silicon, which has a dark conductivity of approximately $10^8$ $\Omega \cdot cm$. In various embodiments, light with a wavelength ranging from 400 nm to 1100 nm is used to illuminate at least portions of the amorphous silicon. The light intensity for activating the light actuated surface tension controlled valve can be low. For example, a light intensity that may be suitable for switching amorphous silicon is 65 mW/cm$^2$. The layer of photoconductive material permits optical control of an electrical potential difference across a corresponding portion of the channel.

In various embodiments, the power source may be chosen from any source suitable for providing a sufficient electrical potential difference across a liquid in a channel. For example, the power source is configured to provide an alternating voltage source. The voltage and frequency characteristics may be chosen according to the materials used in the surface tension controlled valve and/or a device in which the valve is situated. The magnitude of the AC voltage source can vary according to the properties, e.g., the thickness, of the materials used to construct the surface tension controlled valve. In various embodiments, the AC voltage source can supply an electrical potential difference ranging from 10 volts to several hundred volts, with a frequency ranging from 10 Hz to 500 kHz. In one embodiment, the AC voltage source is coupled to the surface tension controlled valve with only two leads. In another embodiment, the AC voltage source is inductively coupled such that no electrical leads are required.

In various embodiments, the light actuated surface tension controlled valves may employ a light source as a means of illuminating the photoconductive material associated with the valve. The light source may be chosen based on any light capable of changing the conductive properties of the photoconductive material. Suitable light sources include collimated light sources, and may be chosen from, for example, lamps, for example and arc lamp, lasers, and light-emitting diodes (LEDs). In various embodiments, the light source may include one or more light sources. For example, a surface tension controlled valve and/or a device containing a surface tension controlled valve may include a first light source and a second light source. In embodiments including more than one light source, the light sources may be chosen from any effective light source. The light source may be directed along at least one axis of the surface tension controlled valve by at least one mirror, for example a computer-controlled array of microfabricated mirrors. In various embodiments, when the light source is a laser beam, the laser beam may be directed over the surface of the photoconductive material with a computer-controlled galvo-mirror.

In various embodiments, the light from the light source can be directed to the photosensitive material by the channel itself. The channel can provide a waveguide to internally reflect and propagate the light so that it reaches the photosensitive material. The waveguide can direct a beam of light to the photoconductive material substantially axially along the length of the channel. In various embodiments, the channel can be configured to provide a waveguide for the light. In various embodiments, the walls of the channel can provide the waveguide by internally reflecting and propagating the light within the channel wall. The channel walls can be constructed of substantially transparent material with the outer surfaces of the transparent material coated with a reflective material. In various embodiments, the channel itself can be the waveguide by internally reflecting and propagating the light within the channel volume whether filled or empty. The inner walls of the channel can be coated with a reflective material.

The term "reflective material" as used herein refers to any material that can reflect a predetermined wavelength of light. Reflective materials can be a coating, a distinct layer, or a various components described herein can themselves act as a reflective materials. Some exemplary reflective materials include, for example, insulators, such as $SiO_2$, TiN, SiON; semiconductor materials, such as silicon, germanium, silicon germanium, and compound semiconductors; polymers, such as Teflon®, Teflon® AF; an organic-inorganic hybrid material as disclosed above, or any other reflective material that will be known to one of ordinary skill in the art.

In various embodiments, the surface tension controlled valves disclosed herein can be used in a variety of applications. For example, the valves can be used to move one or more droplets or combine two or more droplets in a device used for biological synthesis, biological monitoring, or biological screening. In various embodiments, the surface tension controlled valves disclosed herein may be used in microdevices designed for one or more of PCR, ligase chain reactions, antibody binding reaction, oligonucleotide ligations assays, and hybridization assays.

The term "device" as used herein refers to a device that can be used in any number of biological processes involving microfluidics, e.g. microscale amounts, of fluid or larger scale. Generally, microfluidics involves handling volumes of one microliter or less. Features contained in microfluidic devices typically have millimeter to submicrometer dimensions, and may be adapted to the specific use of the microfluidic device.

In various embodiments, individual fluid control in a device, for example a microfluidic device, can be accomplished with a surface tension controlled valve. Referring to FIG. 1, a surface tension controlled valve 5 in its simplest implementation includes a channel 30, a portion 20 of the channel is initially resistant to the flow of a liquid (e.g., is hydrophobic in the case of an aqueous liquid) from the internal volume of surface tension controlled valve 5. As illustrated in FIG. 1, a valve 5 may control fluid flow through channel 30 between reservoir 10 and reservoir 40. The surface tension of the liquid, in combination with the resistance of the surface of at least a portion of channel 30 to the flow of the liquid, prevents its flow from reservoir 40 to reservoir 10. Surface tension controlled valve exploits the fact that under certain circumstances the surface tension of the liquid changes, and that change in turn can trigger a movement of that liquid. Examples of such circumstances that can change the surface tension may include applied electric field (electric field), applied electric field and light (opto-electrowetting), local increase in temperature, and the like.

Figure 2A:
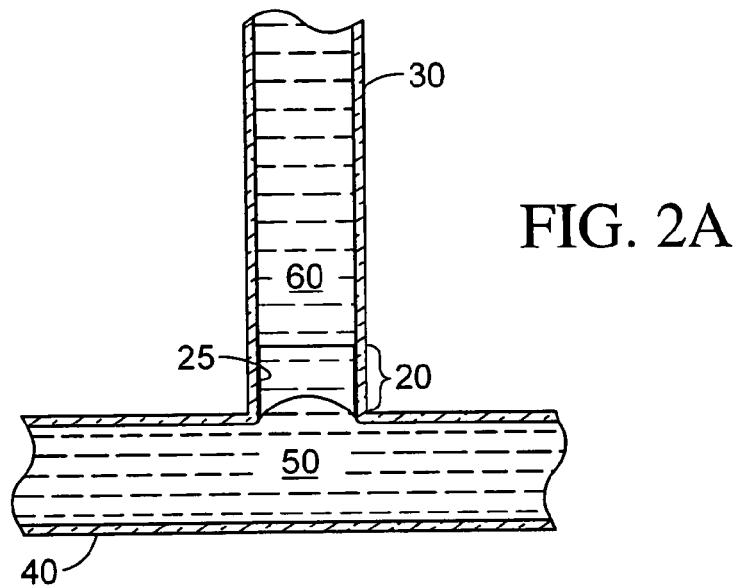
FIGS. 2A & 2B illustrate the principle behind surface tension controlled valves according to the present teachings.
Figure 2B:
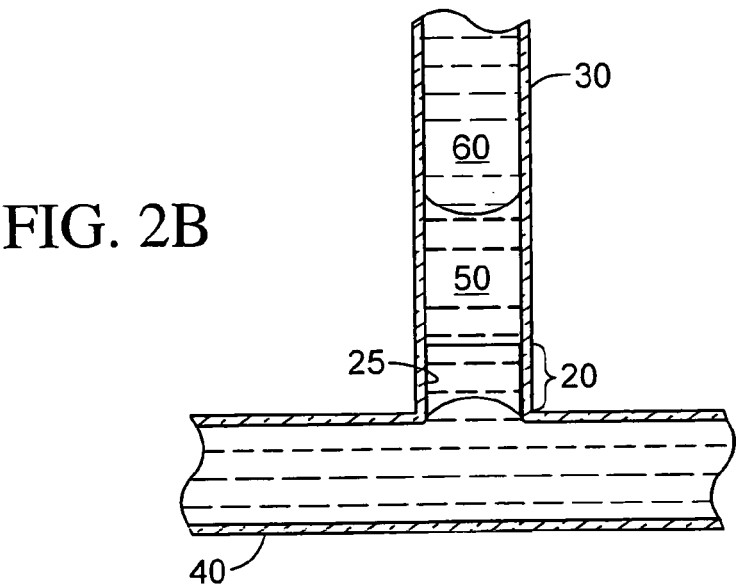

If the surface of a channel is resistant to the flow of a liquid, e.g. is hydrophobic, some additional force or pressure is required to push the liquid through the hydrophobic part of the channel. With reference to FIG. 2A, this principle may be used in hydrophobic valves when, for instance, the first liquid 50 under certain pressure $P_1$ can flow through channel 40 but not channel 30 filled with second liquid 60 (the second liquid could include a gas or be a gas) under pressure $P_2$ and separated by a surface 20 that is resistant to the flow of the first liquid (e.g., the surface is hydrophobic in the case of an aqueous first liquid). If the pressure difference across the valve exceeds a certain threshold pressure $\delta P_{Threshold}$ (where $P_{Threshold} = P_1 - P_2$), the resistance of surface 20 to the flow of first liquid 1 can be overcome and the first liquid can flow into the channel 30 (FIG. 2B).

In various embodiments, a number of techniques are provided for making the pressure difference across the valve exceed a threshold pressure, thereby allowing the passage of a liquid. One technique uses electric fields to effect fluid movement by relying on the ability of electric fields to change the contact angle of the fluid on a surface that is initially resistant to the flow of a liquid. When an electric field gradient is applied to a droplet on a fluid-transporting surface, different contact angles are formed between leading and receding surfaces of the droplet with respect to the fluid transporting surface. This imbalance in surface tension forces will produce a net force that moves the droplet. For example, in the case of a polar liquid droplet, such as a droplet of an aqueous liquid, the application of an electric potential difference across the liquid-solid interface reduces the contact angle, thereby effectively making the surface more hydrophilic. In various embodiments, the electrical potential difference effecting the hydrophilic-hydrophobic conversion are controlled by closing a circuit to at least one electrode arranged on at least one side of a channel making up the surface tension controlled valve.

The term "contact angle" describes the angle formed as a result of contact between a fluid and a solid surface. It reflects the interfacial affinity between the fluid and the solid surface, i.e., the wettability of the surface with respect to the fluid. The contact angle is inversely correlated with interfacial affinity. When the fluid is in direct contact with the solid surface, the contact angle is at least 0° but less than 180°. A contact angle of 180° or greater indicates that the fluid is not in direct contact with the solid surface. In such a case, the fluid may directly contact the surface through an interposing fluid, or may be levitated from the solid surface. By way of illustration, a highly hydrophilic surface may form a low angle, e.g., 1°, with respect to water droplets. Similarly, a highly hydrophobic surface may form a high contact angle, such as 179°, with respect to water.

Figure 3:
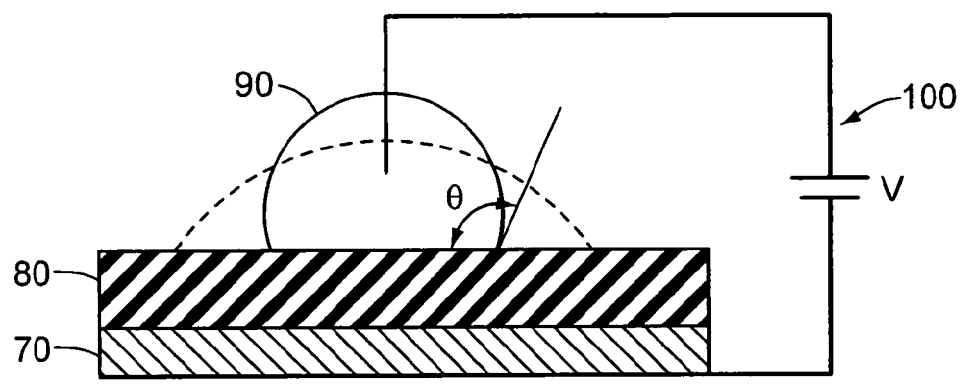
FIG. 3 illustrates movement of a liquid by electrowetting.

In various embodiments, one way to alter the surface tension of a liquid in a surface controlled tension valve is by applying an electric field. An exemplary embodiment is shown in FIG. 3. An electrode 70 is embedded below a surface of an insulation layer 80, and a droplet of a polar liquid 90 is disposed in the channel. The droplet 90 forms a contact angle Θ with the surface of the insulation layer 80. A power source 100 is configured to apply an electrical potential difference between the liquid droplet 90 and the electrode 70. When the circuit including the electrode, power source, and the liquid droplet 90 is closed and the electrical potential difference is applied, different contact angles Θ are formed between leading and receding surfaces of the droplet with respect to the surface 80. This imbalance in surface tension forces produces a net force and moves the droplet to the position indicated by the broken line.

In various embodiments, and as shown in FIG. 3, the top side of the electrode may be insulated from the liquid droplet by an insulation layer 80. In a microfluidic device, each electrode (and potentially each surface tension controlled valve) suitably contains a way of independent electrical addressing/connection, which may be accomplished by, for example, disposing a printed circuit at the bottom of the chip.

Figure 4A:
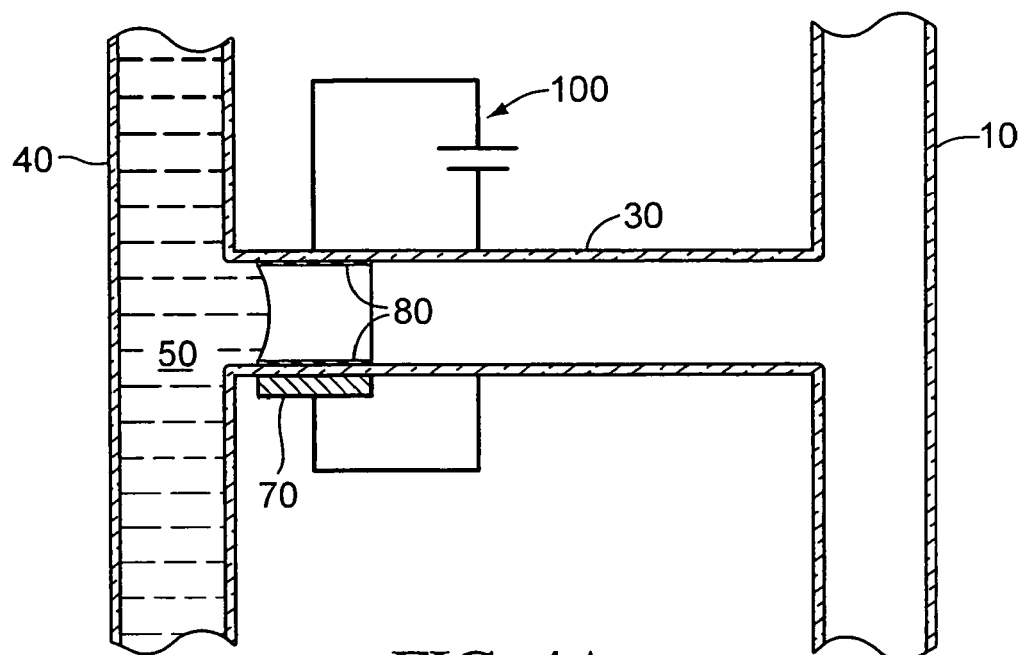
FIG. 4A illustrates a surface tension controlled valve closed to the flow of a liquid according to the present teachings.

In various embodiments, one aspect of a surface tension controlled valve in accordance with the present invention is illustrated in FIG. 4A. Reservoir 40 contains a liquid 50 that flows into, but not past, a portion of channel 30 that is resistant to the flow of the liquid. An electrode 70 and insulator 80 are positioned along one wall of channel 30, which channel communicates with reservoir 10. A power source and electro-wetting circuit 100 is configured to apply an electrical potential difference across at least that portion of the channel 30 that is resistant to the flow of the liquid 50. Absent the presence of the electrical potential difference, or any other surface tension-breaking source, the liquid will not flow past that portion of channel 30 because the liquid does not exceed a certain threshold pressure necessary to break the surface tension of the liquid.

Figure 4B:
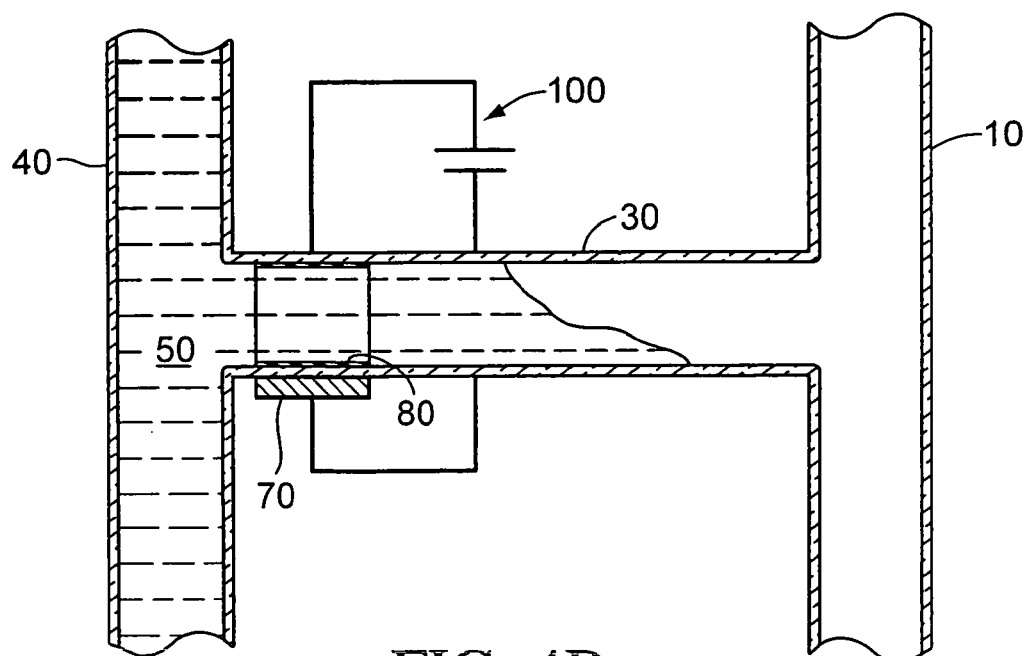
FIG. 4B illustrates a surface tension controlled valve permitting the flow of a liquid according to the present teachings.

In various embodiments, FIG. 4B illustrates the operation of the surface tension controlled valve when the circuit 100 is closed and an electrical potential difference exists between electrode 70 and the liquid 50 in channel 30. The applied electric field changes the contact angle of the edge of the liquid leading into channel 30, thereby breaking the surface tension. When the power source generates an electrical potential difference, the imbalance in surface tension between the leading and receding edges of the liquid produces a net force, which causes movement of the liquid. The liquid is then permitted to flow through channel 30, past the portion of the channel initially resistant to the flow of the liquid, and into reservoir 10. In various embodiments, opening the circuit and shutting off the electric field can stop the flow of the liquid through channel 10.

Figure 5A:
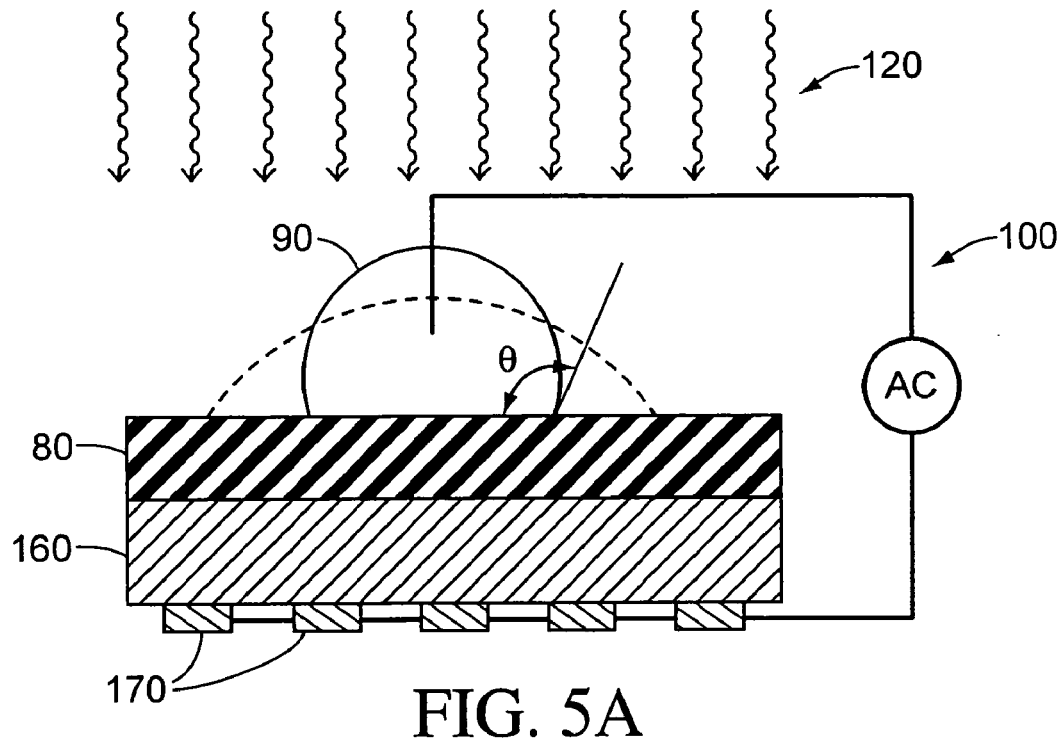
FIG. 5 illustrates movement of a liquid by opto-electrowetting.
Figure 5B:
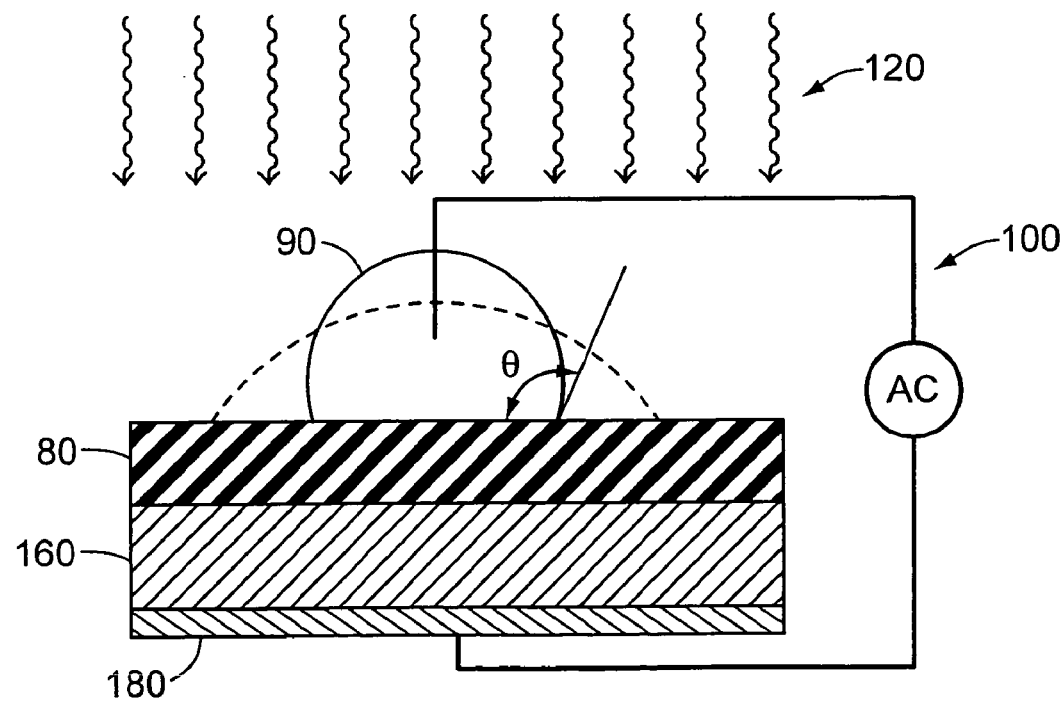
Figure 5C:
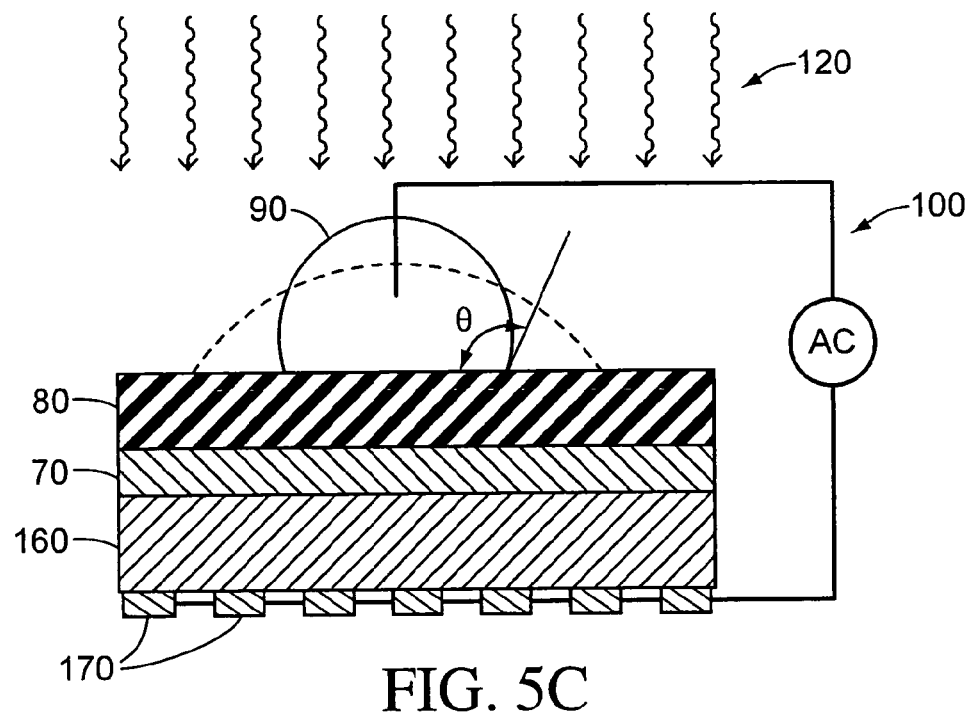

In various embodiments, the electric circuit may be activated using light. One implementation of this is shown in FIG. 5, wherein a layer of photoconductive material 160 is added between the embedded electrode 70 (which is coupled to insulation layer 80) and electro-wetting circuit 100. In various embodiments, electrode 70 can be positioned between photoconductive material 160 and insulator 80. In various embodiments, a conductive layer (not shown) can be positioned between photoconductive material 160 and insulator 80. A droplet 90 of a liquid forms a contact angle Θ with the surface upon which it rests. Although the power source may be providing a current, the electro-wetting circuit will not close unless the photoconductive material is illuminated with light. Only then will the circuit close, enabling an electrical potential difference to flow between the electrode 70 and the liquid droplet 90.

Figure 6A:
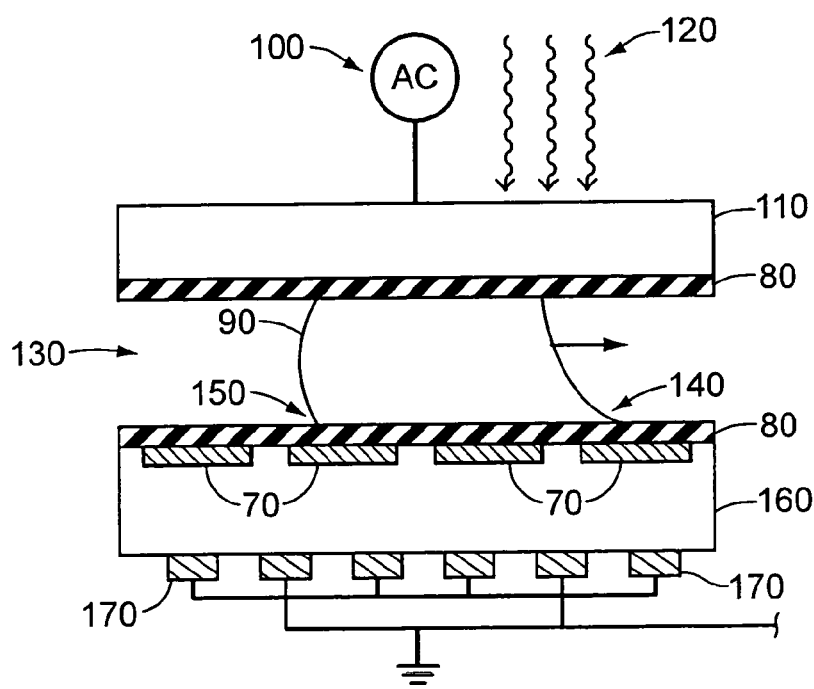
FIG. 6 illustrates moving a liquid through a channel via opto-electrowetting.

FIG. 6 illustrates a channel 130 created by an internal volume between insulating layers 80. The topside of a channel 110 is sufficiently transparent to allow a light beam 120 to pass through the channel 110 and to a photoconductive layer 160, which contains an array of electrodes 70. When illuminated by light beam 120, the conductivity of the illuminated portion of the photoconductive layer 160 changes significantly, thus allowing the circuit 100 to close between the electrodes 70 and the liquid droplet 90. More specifically, the portion of the photoconductive material that is illuminated by a beam of light is capable of transmitting a higher electric field intensity than a portion of the photoconductive layer that is not illuminated. The applied potential difference makes the surface less resistant to the flow of the liquid droplet, e.g., more hydrophilic in the case of an aqueous liquid. The contact angle of the liquid changes, and the liquid propagates along the channel.

In various embodiments, biological fluid-handling can be provided by utilizing the principles described above for a valve configured for light activation. A channel connected to section 20 that forms an internal volume of the valve. The internal volume of the valve is bound by an insulating layer resistant to the flow of the biological liquid. The channel is not resistant to the flow of the biological liquid. The photoconductive material can be coupled to the insulating layer. The electrode that forms the electro-wetting circuit can be coupled to the photoconductive material and configured to electrically couple with the insulating layer through the photoconductive material when the photoconductive material is activated by light. The power source can be electrically coupled to the electrode. The power source is configured to provide an electrical potential difference across the insulting layer capable of changing the wettability of the insulting material. The light source can be configured to activate the photoconductive material thereby providing the electrical potential difference between the insulating layer and the biological fluid. The amount of electrical potential difference is configured to reduce the resistance of the insulating layer to the flow of the biological liquid.

In various embodiments, the light beam 120 is capable of moving, e.g., being directed along the length of the channel 130. Such movement may be possible by the use of any device capable of moving a beam of light such as, by way of non-limiting example, a galvo-mirror known in the art of laser etching or an array of microfabricated mirrors known in the art of digital light projection. As the light beam is directed along the length of channel 130, the illuminated portions of the photoconductive material close the circuit between the respective electrode and the liquid droplet 90. The contact angle of the leading edge 140 of the droplet changes to a different contact angle from the receding edge 150, an imbalance in surface tension results, and the droplet thus propogates in the direction of the beam of light.

Figure 7A:
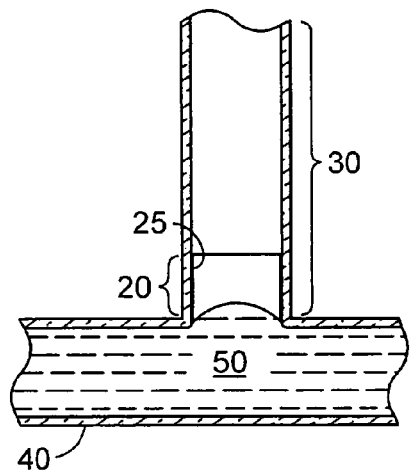
FIGS. 7A-7D illustrates the operation of a light-actuated surface tension controlled valve according to the present teachings.
Figure 7B:
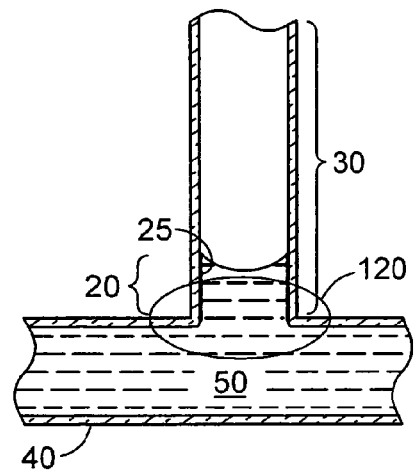
Figure 7C:
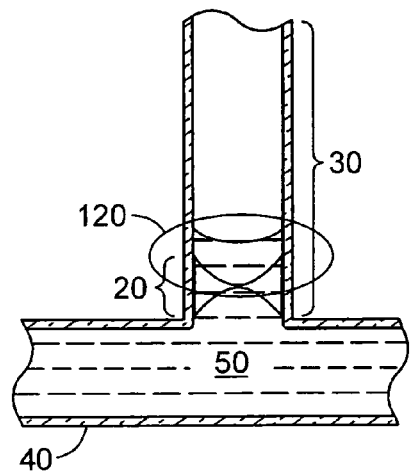
Figure 7D:
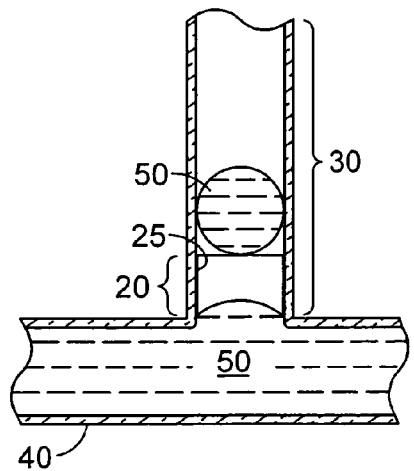

That same principle is used to construct a light-actuated valve (FIGS. 7A-7D). In normal conditions (no light) the valve is closed, because the liquid in channel 40 has not exceeded a threshold pressure such that it can pass the portion 20 of channel 30 that is resistant to the flow of the liquid 50 (FIG. 7A). Portion 20 can include multi-layers 25 that can include an insulator, an electrode, and a photosensitive layer as described above. When the light beam 120 illuminates and activates the electro-wetting circuit formed in the area where liquid 50 contacts surface 20, the surface becomes less resistant to the flow of the liquid 50, and the liquid moves into the channel 30 (FIG. 7B). The beam of light 120 then shifts toward the channel 30 followed by the liquid (FIG. 7C). Once the light 120 moves across and above surface 20, and part of surface 20 is not illuminated anymore, some liquid will break apart from the liquid in channel 40, and after the light is switched off, that liquid will be displaced into channel 30 (FIG. 7D).

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein. For example, a range of "less than 10" includes any and all subranges between (and including) the minimum value of zero and the maximum value of 10, that is, any and all subranges having a minimum value of equal to or greater than zero and a maximum value of equal to or less than 10, e.g., 1 to 5.

It is noted that, as used in this specification and the appended claims, the singular forms "a," "an," and "the," include plural referents unless expressly and unequivocally limited to one referent. Thus, for example, reference to "a channel species" includes two or more different channels. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to various embodiments described herein without departing from the spirit or scope of the present teachings. Thus, it is intended that the various embodiments described herein cover other modifications and variations within the scope of the appended claims and their equivalents.

What is claimed is:

1. A valving system for liquid comprising:
   a channel defined by a channel wall;
   a first reservoir connected via the channel to a second reservoir, wherein the first reservoir includes a first liquid;
   a first insulating layer portion and a second insulating layer portion, each coupled to the interior surface of the channel wall of a portion of the channel;
   a photoconductive material coupled to the first insulating layer portion, wherein the first insulating layer portion and the second insulating layer portion coupled to the interior surface of the channel wall prevent the flow of liquid between the at least two reservoirs; and
   a power source in electrical communication with the photoconductive material, wherein the photoconductive material is activatable by directed light to provide an electrical potential difference across the first insulating layer portion and the second insulating layer portion, and wherein the electrical potential difference is operable for reducing the resistance of the first insulating layer portion and the second insulating layer portion to allow the first liquid to flow into the second reservoir.

2. The system of claim 1, wherein the second reservoir includes a second liquid and wherein the electrical potential difference is operable for reducing the resistance of the first insulating layer portion and the second insulating layer portion to allow the first liquid to flow into the second reservoir to mix with the second liquid.

3. The system according to claim 1, further comprising a conductive layer located between the first insulating layer portion and the photoconductive material.

4. The system according to claim 1, wherein the first and second reservoirs are chosen from wells and channels.

5. The system according to claim 1, wherein the valving system is configured to control the flow of the liquid between the at least two reservoirs.

6. The system according to claim 1, wherein the first insulating layer portion and the second insulating layer portion comprises a hydrophobic material.

7. The system according to claim 1, wherein reducing the resistance of the first insulating layer portion and the second insulating layer portion changes the first insulating layer portion and the second insulating portion to be hydrophilic.

8. A method for moving a liquid in a valving system, the method comprising:
   providing a first liquid in a first reservoir of the valving system, wherein the valving system comprises:
      a channel defined by a channel wall,
      a second reservoir connected via the channel to the first reservoir, wherein the first reservoir includes the first liquid,
      a first insulating layer portion and a second insulating layer portion, each coupled to the interior surface of the channel wall of a portion of the channel,
      a photoconductive material coupled to the first insulating layer portion, wherein the first insulating layer portion and the second insulating layer portion coupled to the interior surface of the channel wall prevent the flow of liquid between the at least two reservoirs, and
      a power source in electrical communication with the photoconductive material, wherein the photoconductive material is activatable by directed light to provide an electrical potential difference across the first insulating layer portion and the second insulating layer portion, and wherein the electrical potential difference is operable for reducing the resistance of the first insulating layer portion and the second insulating layer portion to allow the first liquid to flow into the second reservoir; and
   activating a directed light source to activate the photoconductive material to allow the first liquid to flow into the second reservoir.

9. The method of claim 8, wherein the second reservoir includes a second liquid and wherein the electrical potential difference is operable for reducing the resistance of the first insulating layer portion and the second insulating layer portion to allow the first liquid to flow into the second reservoir to mix with the second liquid.

10. The method of claim 9, further comprising:
    mixing the first liquid with the second liquid in the second reservoir.

11. The method of claim 10, further comprising, deactivating the directed light source to prevent the first liquid from flowing into the second reservoir.

12. The method of claim 8, wherein the valving system further comprises a conductive layer located between the first insulating layer portion and the photoconductive material.

13. The method of claim 8, wherein the first and second reservoirs are chosen from wells and channels.

14. The method of claim 8, wherein the first insulating layer portion and the second insulating layer portion comprises a hydrophobic material.

15. The method of claim 8, wherein activating the photoconductive material reduces the resistance of the first insulating layer portion and the second insulating layer portion so that the first insulating layer portion and the second insulating portion is hydrophilic.

* * * * *